US012809606B2

(12) United States Patent
Kailas

(10) Patent No.: US 12,809,606 B2
(45) Date of Patent: Nov. 24, 2026

(54) LLM-BASED CODE TRANSLATION AND VIRTUAL DEPLOYMENT

(71) Applicant: INTERNATIONAL BUSINESS MACHINES CORPORATION, Armonk, NY (US)

(72) Inventor: Krishnan Kunjunny Kailas, West Orange, NJ (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 18/798,265

(22) Filed: Aug. 8, 2024

(65) Prior Publication Data

US 2026/0044327 A1 Feb. 12, 2026

(51) Int. Cl.

*G06F 8/35* (2018.01)
*G06F 8/41* (2018.01)
*G06F 8/51* (2018.01)
*G06F 9/45* (2006.01)
*G06F 11/3604* (2025.01)
*G06F 11/362* (2025.01)
(Continued)

(52) U.S. Cl.

CPC .................................... *G06F 8/51* (2013.01)

(58) Field of Classification Search

CPC . G06F 8/51; G06F 8/425; G06F 8/427; G06F 8/433; G06F 8/75; G06F 11/0793; G06F 11/3604; G06F 11/3616; G06F 8/42; G06F 9/45508; G06F 9/45512; G06F 11/3612; G06N 3/044; G06N 3/045; G06N 3/0455; G06N 3/08

See application file for complete search history.

(56) References Cited

U.S. PATENT DOCUMENTS 8,312,071 B2 11/2012 Kailas et al.
9,063,807 B2 6/2015 Kailas et al.
11,875,123 B1 1/2024 Ben David et al.
(Continued)

FOREIGN PATENT DOCUMENTS

CN 116681088 A 9/2023
CN 116795379 A 9/2023
CN 117273026 A 12/2023

OTHER PUBLICATIONS

A. Gulati, Controllable LLM Debugging: Knowing when to Stop Matters, 7 pages (Year: 2019).*
(Continued)

*Primary Examiner* — Thuy Dao
(74) *Attorney, Agent, or Firm* — Harrity & Harrity, LLP

(57) ABSTRACT

Methods and systems for code translation include translating source code for an original program, written in a first programming language, to source code for a translated program, written in a second programming language, using a language model. The original program and the translated program are instrumented, using comparison regions of each, to configure the original program and the translated program to generate respective outputs at equivalent points. The original program and the translated program are executed concurrently to generate an original output and a translated output. The language model is updated to correct the translated program based on a discrepancy between the original output and the translated output.

20 Claims, 5 Drawing Sheets

(51) Int. Cl.
*G06F 11/3668* (2025.01)
*G06N 20/00* (2019.01)

(56) References Cited

U.S. PATENT DOCUMENTS

| | | | | |
|---|---|---|---|---|
| 12,406,072 | B2 * | 9/2025 | Chan | G06F 11/0793 |
| 12,627,645 | B2 * | 5/2026 | Weinstein | H04L 63/08 |
| 12,645,524 | B2 * | 6/2026 | Christensen | G06F 11/079 |

OTHER PUBLICATIONS

Kailas, K., Paruthi, V., & Monwai, B. (Nov. 15, 2009). Formal verification of correctness and performance of random priority-based arbiters. In 2009 Formal Methods in Computer-Aided Design (pp. 101-107). IEEE.

Chen, X., Lin, M., Scharli, N., & Zhou, D. (Apr. 11, 2023). Teaching large language models to self-debug. arXiv preprint arXiv:2304.05128.

Karanjai, R., Xu, L., & Shi, W. (Mar. 13, 2024). Teaching Machines to Code: Smart Contract Translation with LLMs. arXiv preprint arXiv:2403.09740.

Zan, C., Ding, L., Shen, L., Zhen, Y., Liu, W., & Tao, D. Mar. 21, 2024). Building Accurate Translation-Tailored LLMs with Language Aware Instruction Tuning. arXiv preprint arXiv:2403.14399.

Yang, Z., Liu, F., Yu, Z., Keung, J. W., Li, J., Liu, S., . . . & Li, G. Jul. 12, 2024). Exploring and unleashing the power of large language models in automated code translation. Proceedings of the ACM on Software Engineering, 1(FSE), 1585-1608.

* cited by examiner

LLM-BASED CODE TRANSLATION AND VIRTUAL DEPLOYMENT

BACKGROUND

The present invention generally relates to language models and, more particularly, to automated source code translation.

Many critical systems, including government, financial, and utility computer systems, run on aging legacy software. In some cases these software applications have been in place for many decades and were developed using programing languages and runtime environments that few people have the skills to maintain. Migrating and rewriting such software to modern programing languages and runtime systems may be challenging, as they represent large code bases that have been tuned over the course of many decades. Translating source code to a new programming language environment is a time consuming, labor-intensive process.

SUMMARY

A method for code translation includes translating source code for an original program, written in a first programming language, to source code for a translated program, written in a second programming language, using a language model. The original program and the translated program are instrumented, using comparison regions of each, to configure the original program and the translated program to generate respective outputs at equivalent points. The original program and the translated program are executed concurrently to generate an original output and a translated output. The language model is updated to correct the translated program based on a discrepancy between the original output and the translated output.

A computer program product (CPP) for code translation includes a set of one or more computer-readable storage media and program instructions, collectively stored in the set of one or more storage media. The program instructions cause a processor set to translate source code for an original program, written in a first programming language, to source code for a translated program, written in a second programming language, using a language model, to instrument the original program and the translated program, using comparison regions of each, to configure the original program and the translated program to generate respective outputs at equivalent points, to execute the original program and the translated program concurrently to generate an original output and a translated output, and to update the language model to correct the translated program based on a discrepancy between the original output and the translated output.

A computer system (CS) for code translation includes a processor set, a set of one or more computer-readable storage media, and program instructions, collectively stored in the set of one or more storage media. The program instructions cause the processor set to translate source code for an original program, written in a first programming language, to source code for a translated program, written in a second programming language, using a language model, to instrument the original program and the translated program, using comparison regions of each, to configure the original program and the translated program to generate respective outputs at equivalent points, to execute the original program and the translated program concurrently to generate an original output and a translated output, and to update the language model to correct the translated program based on a discrepancy between the original output and the translated output.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
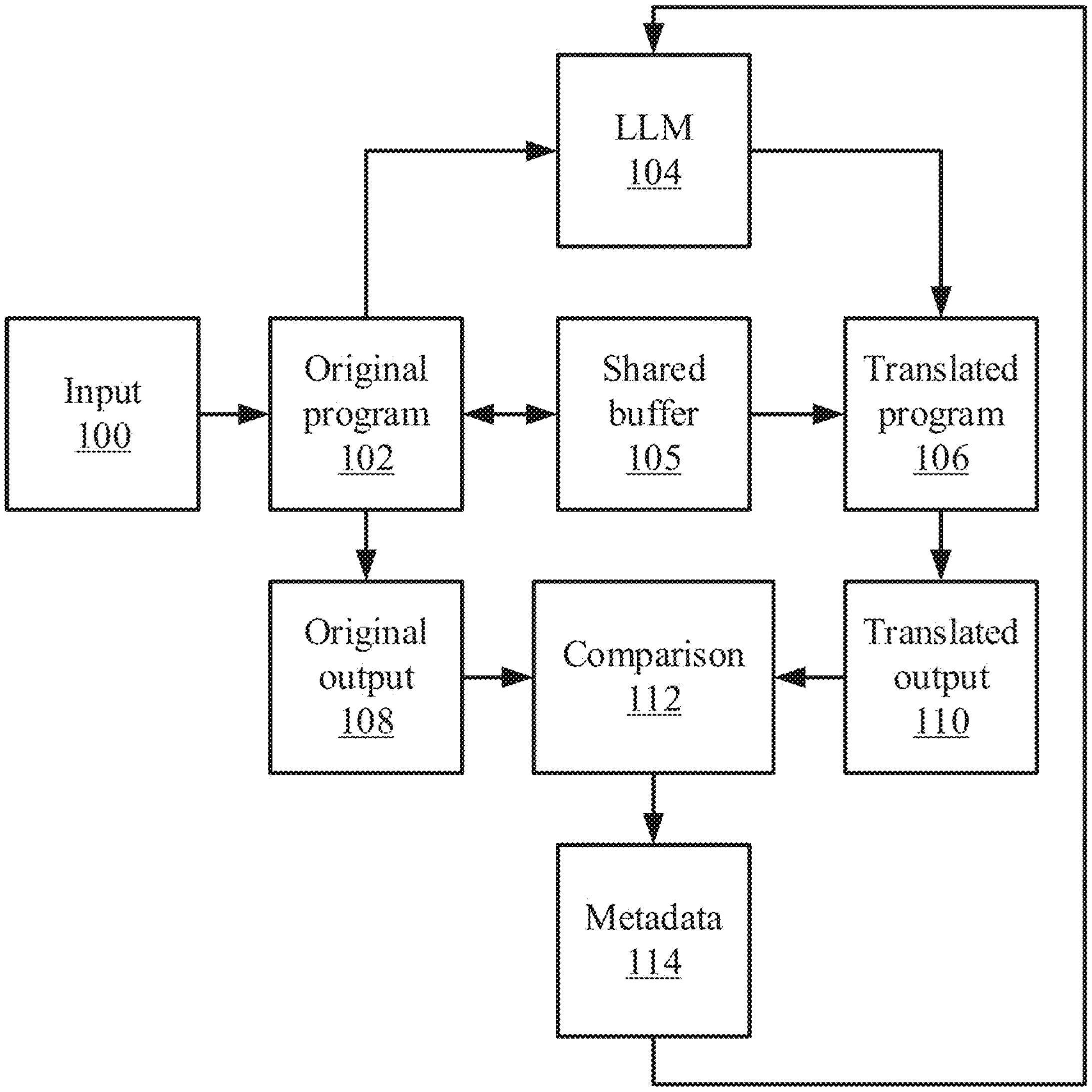
FIG. 1 is a block diagram of a code translation system, where a large language model (LLM) is used to automatically translate source code of an original program, using a shared buffer to provide communication between the original program and a translated program, and a storage for the metadata in accordance with an embodiment of the present invention.

Large language models (LLMs) can translate computer program source code from an original programming language into a target programming language. This makes it possible to rapidly translate legacy code to a new software environment. However, language models suffer from poor accuracy and can generate code that fails to perfectly replicate the functionality of the original code. This can have very negative effects, particularly when the computer program in question runs a system that handles public safety or financial functions.

To ensure that translated code performs its function safely and accurately, it may be executed in parallel with the original system to verify that it generates the correct outputs. Thus a given input may be provided to both the original system and the translated system and their outputs may be compared to one another. Any discrepancies may be captured as metadata that may be used for further fine-tuning of the large language model (LLM) to improve the quality of the translated program. Translation errors may further be corrected on-the-fly using metadata for runtime feedback. After performing this parallel execution for a period of time, it can be said with confidence that the language model has accurately translated the computer program from the original programming language to the target programming language.

According to an aspect of the invention, a method for code translation includes translating source code for an original program, written in a first programming language, to source code for a translated program, written in a second programming language, using a language model. The original program and the translated program are instrumented, using comparison regions of each, to configure the original program and the translated program to generate respective outputs at equivalent points. The original program and the translated program are executed to generate an original output, a translated output and a metadata output based on a comparison of the original output and translated output. The language model is updated to correct the translated program based on a discrepancy between the original output and the translated output. The concurrent execution of the original program and the translated program, with outputs being generated at equivalent points for comparison, and metadata output being generated based on the comparison result makes it possible to automatically update the translated program to correct errors.

In embodiments, the equivalent points may be identified using external calls by the original program and the translated program. These external calls represent points where the behavior of the two programs should be identical, regardless of the internal operations performed by each program.

In embodiments, the equivalent points may be identified based on context window length limits imposed by the language model. Since language models have limited context window lengths, these lengths may be used to control the points at which the original program and the translated program are compared.

In embodiments, the equivalent points may be identified based on a last update to a variable that is visible in both the original program and the translated program. Because the two different programs may be compiled in different ways and with different optimizations, there may be different intermediate values stored to a given variable. Using the last update to the variable identifies a point that should be equivalent for both programs.

In embodiments, a prompt used to perform translation is updated to correct discrepancies during run-time. This makes it possible to update the translated program without having to reconfigure the system.

In embodiments, the language model is fine-tuned to correct the discrepancy offline. This makes it possible to improve the translation capabilities of the language model for future translations.

In embodiments, the original program and the translated program are executed with a shared memory buffer, with write accesses by the translated program that modify externally observable system states being blocked. The shared memory buffer makes it possible to execute both programs concurrently, while preventing potential errors in the translated program from interfering with the operation of the original program.

In embodiments, the original program is executed on an input and the translated program is executed on information stored in the shared memory buffer by the original program. This one-way flow of information from the original program to the translated program maintains performance during the concurrent execution of the two.

In embodiments, the comparison of comparing the original output to the translated output generates a metadata output that captures the discrepancy, and updating the language model is based on the metadata. This metadata is used to improve the translation of the translated program.

In embodiments, execution of the translated program is continued after identification of a discrepancy between the original output and the translated output using a program state of the original program from a shared memory buffer. Continuing the execution of the translated program using a known-good program state makes it possible to detect additional downstream defects in the translated program's output.

A computer program product (CPP) for code translation includes a set of one or more computer-readable storage media and program instructions, collectively stored in the set of one or more storage media. The program instructions cause a processor set to translate source code for an original program, written in a first programming language, to source code for a translated program, written in a second programming language, using a language model, to instrument the original program and the translated program, using comparison regions of each, to configure the original program and the translated program to generate respective outputs at equivalent points, to execute the original program and the translated program concurrently to generate an original output and a translated output, and to update the language model to correct the translated program based on a discrepancy between the original output and the translated output. The concurrent execution of the original program and the translated program, with outputs being generated at equivalent points for comparison, makes it possible to automatically update the translated program to correct errors.

A computer system (CS) for code translation includes a processor set, a set of one or more computer-readable storage media, and program instructions, collectively stored in the set of one or more storage media. The program instructions cause the processor set to translate source code for an original program, written in a first programming language, to source code for a translated program, written in a second programming language, using a language model, to instrument the original program and the translated program, using comparison regions of each, to configure the original program and the translated program to generate respective outputs at equivalent points, to execute the original program and the translated program concurrently to generate an original output and a translated output, and to update the language model to correct the translated program based on a discrepancy between the original output and the translated output. The concurrent execution of the original program and the translated program, with outputs being generated at equivalent points for comparison, makes it possible to automatically update the translated program to correct errors.

In embodiments, the program instructions further cause the processor set to identify the equivalent points using external calls by the original program and the translated program. These external calls represent points where the behavior of the two programs should be identical, regardless of the internal operations performed by each program.

In embodiments, the program instructions further cause the processor set to identify the equivalent points based on context window length limits imposed by the language model. Since language models have limited prompt lengths, these lengths may be used to control the points at which the original program and the translated program are compared.

In embodiments, the program instructions further cause the processor set to identify the equivalent points based on a last update to a variable that is visible in both the original program and the translated program. Because the two different programs may be compiled in different ways and with different optimizations, there may be different intermediate values stored to a given variable. Using the last update to the variable identifies a point that should be equivalent for both programs.

In embodiments, the program instructions further cause the processor set to a prompt used to perform translation to correct the discrepancy during run-time. This makes it possible to update the translated program without having to reconfigure the system.

In embodiments the program instructions further cause the processor set to fine-tune the language model to correct the discrepancy offline. This makes it possible to improve the translation capabilities of the language model for future translations.

In embodiments, the program instructions further cause the processor set to execute the original program and the translated program with a shared memory buffer, with write accesses by the translated program that modify externally observable system states being blocked. The shared memory buffer makes it possible to execute both programs concurrently, while preventing potential errors in the translated program from interfering with the operation of the original program.

In embodiments, the program instructions further cause the processor set to execute the original program on an input and to execute the translated program on information stored in the shared memory buffer by the original program. This one-way flow of information from the original program to the translated program maintains performance during the concurrent execution of the two.

In embodiments, the program instructions further cause the processor set to continue execution of the translated program after identification of a discrepancy between the original output and the translated output using a program state of the original program from a shared memory buffer. Continuing the execution of the translated program using a known-good program state makes it possible to detect additional downstream defects in the translated program's output.

Referring now to FIG. 1, a block diagram illustrating code translation with virtual runtime deployment and feedback is shown. An original program 102 is translated to a translated program 106 using an LLM 104. The LLM 104 may be any appropriate language model, and may include a general-purpose LLM or may include a language model that is trained for the specific purpose of code translation. It should be understood that any appropriate language translation may be used instead of an LLM. Additionally, although the present embodiments are described with respect to a single translated program 106, it should be understood that any number of translated programs 106 may be generated, in different target programming languages and/or different environments.

The original program 102 is written in a source programming language and the translated program 106 is written in a target programming language. The target programming language may be a different programming language entirely, may be an updated version of the source programming language, or may be the same programming language but written with different libraries, dependencies, or environments. The translated program 106 may be executed on the same hardware as the original program 102, on different hardware, or on a virtual machine that emulates or replicates hardware that will be used in production.

The LLM 104 may generate errors in the translated program 106. While it can be a simple matter to identify errors that prevent execution of the translated program 106, it can be more difficult to identify errors that cause the output of the translated program 106 to imperfectly replicate the outputs of the original program 102.

To detect such errors, both the original program 102 and the translated program 106 may be executed in parallel, with a same input 100 being provided to both. In some cases, inputs 100 to the original program 102 and corresponding original outputs 108 may be recorded, and the same inputs 100 may later or separately be used with the translated program 106 to generate translated outputs 110. The original output 108 and the translated output 110 for a given input 100 may be compared 112 to determine whether there are any discrepancies. The result of comparison 112 may be stored as the metadata 114.

When the original program 102 and the translated program 106 are executed concurrently, for example on same hardware using separate processing threads, the thread of the original program 102 performs all external accesses. A shared memory buffer 105 may be used to communicate data from the original program 102 to the translated program 106. The translated program only reads from the shared buffer 105, whereas the original program 102 may perform both reads and writes. As a result, although both programs are running concurrently, there is only one set of read/write operations being performed, thereby preventing an increased burden on the input/output (I/O) resources of the system. Although each of the programs is described herein as relating to a single respective thread, it should be understood that each program may be implemented using multiple threads. During runtime, the original program 102 pushes data to the shared memory buffer 105. If the original program 102 executes significantly faster than the translated program 106, the original program 102 may start to overwrite data in the shared buffer 105 before the translated program 106 can get to it. While this may lead to incorrect outputs by the translated program 106, it will not affect the outputs of the original program 102. This outcome will be reflected in the metadata 114 of the translated program 106 as an indication to increase the size of the shared memory buffer 105. Furthermore, the thread of the original program 102 will not block waiting for the translated program 106 to catchup and read the input data from the shared memory buffer 105, whereas the reverse may occur.

The metadata 114 may include information relating to a unique identifier of a location in the source code of the programs, an execution path or call stack, a type of failure or error, a data value, and/or an event timestamp. For example, if a mismatch is detected between output values in the original program 102 and the translated program 106, then the unique identifier of the location in each program, the call stack, the type of failure, and the data values (both correct and incorrect) may be saved as metadata 114. The identifiers can be used to localize the faults and offline analysis of the metadata can help to classify the types and causes of failures over an extended period of time.

Only writes from the original program 102 may be committed to the shared memory buffer 105 and used for updating externally visible system state, though the external write calls from the translated program 106 may be recorded and compared to corresponding calls from the original program 102 to ensure that they are equivalent. Write accesses to the shared storage area by the translated program 106 may be blocked. Mismatches may be logged as metadata 114 by comparison 112.

The metadata 114 may be used during runtime to provide further prompting to the LLM 104 to correct errors in the translated program 106 and to improve performance. The metadata 114 may be stored in memory buffers for faster access for on-the-fly remediation of translation errors at runtime. However, due to the finite capacity of in-memory storage metadata may be periodically offloaded to persistent storage for long running programs to prevent buffer overflows. The metadata 114 may further be processed offline to fine-tune the LLM 104 itself. Thus the metadata 114 residing on persistent storage may be used for analysis and comparison 112, as well as for unit test coverage, bug isolation, performance comparison, and optimization. Performance comparison and optimization of the translated program 106 may be done using the timestamps of events/records in metadata 114 as it can provide an estimate of the executing time of code segments. The LLM 104 may further be fine-tuned offline based on the metadata 114 that captures the results of the comparison 112 to improve its ability to translate.

During execution of the translated program 106, when the translated program 106 generates a translated output 110 that differs from the original output 108, execution of the translated program 106 may continue using information from the shared memory buffer 105 instead of relying on the internal state of the translated program 106. In this manner, propagation of errors can be limited to portions of the translated program 106 between identified equivalent points. The downstream execution of the translated program 106 can thereby continue even after a first defect is found, speeding the process of identifying and correct errors.

Figure 2:
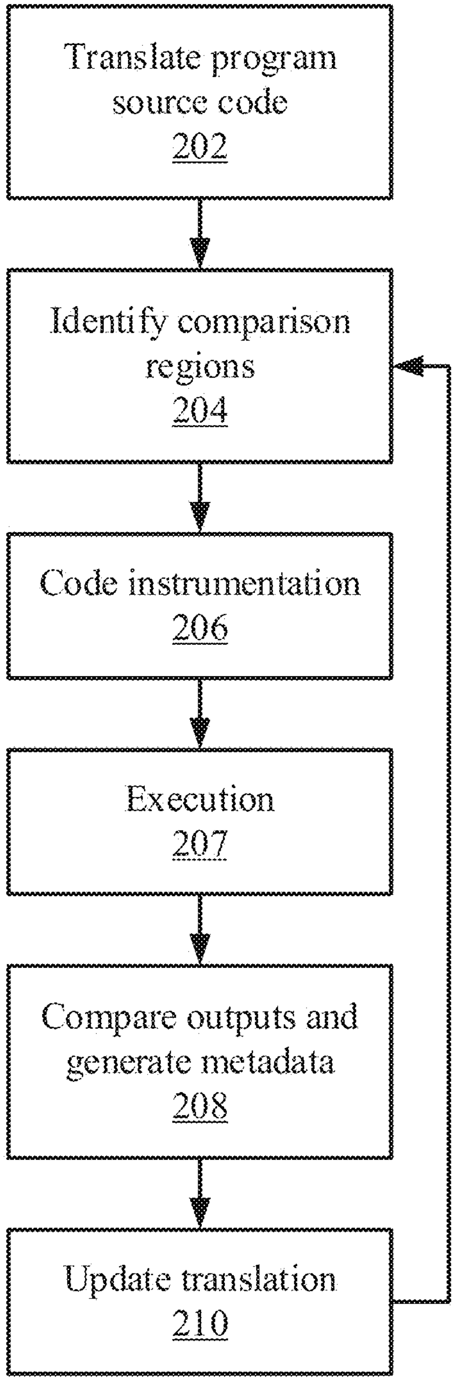
FIG. 2 is a block/flow diagram of a method of performing code translation, where an original program and a translated program are executed together and their respective outputs are compared to improve the translation, in accordance with an embodiment of the present invention.

Referring now to FIG. 2, a method of code translation is shown. Block 202 uses the LLM 104 to translate the original program 102 to the translated program 106. Before execution, block 204 identifies regions of the code to compare between the original program 102 and the translated program 106. For example, functional blocks may be identified where outputs may be compared. This provides controllable granularity for the comparison 112, so that particular regions of the translated program 106 may be identified as generating deviant responses in comparison to the corresponding regions of the original program 102. The operation of the LLM 104 may then be refined based on the comparison 112 of these specific regions, rather than based on the output of the entire program.

Block 206 uses instrumentation to add reporting outputs to the original program 102 and the translated program 106, and to compare the outputs to generate metadata 114. This instrumentation may include, for example, outputs of the program states for the comparison regions.

The programs are executed in block 207, which may necessitate compiling the source code of each to an executable binary or using a language runtime system to interpret statements or instructions of original program 102 and/or translated program 106. During execution of the original program 102 and the translated program 106, the output from the instrumentation may be compared and the metadata may be generated in block 208. Block 210 may then update the translation based on the metadata 114, for example during run-time by prompting the LLM 104 to retranslate the code to fix the error or by offline fine-tuning the LLM 104 via offline analysis of the metadata 114. The updated translation may include new source code for the translated program, which may be instrumented again and which may be recompiled to an executable binary.

The instrumentation may include adding code for communicating data to initialize the state of the translated program 106, for setting up a shared memory buffer 105 that can be accessed by both programs, to pass a pointer to the shared memory buffer as needed, and to initialize internal data structures and objects for the translated program 106 based on data received from the original program 102. Further instrumentation may include adding code to send data from the original program 102 to the translated program 106, to receive such data at the translated program 106, to block execution at the translated program 106 while waiting for such data, and to perform comparison of outputs for generating metadata 114 comprising of the comparison results, timestamps and other artifacts pertaining to code and runtime events.

Updating the translation 210 during runtime may include a prompt to the LLM 104 that has the original program 102, an error message derived from the metadata 114 resulting from comparison 208, the input data 100 that caused the error, an expected result, and an instruction to the LLM 104. For example, the prompt may instruct the LLM 104 to review the error message and to fix the error in the translated program 106 when given the provided input data 100. In some cases, a prompt may include the input values that resulted in the failure of the translated program 106, the incorrect output values generated by the translated program 106, the expected correct output produced by the original program 102, and the source relevant localized source code of each program. The metadata 114 may further be used for fault localization, to identify the specific locations (e.g., particular lines of code or functions) in the translated program 106 that are responsible for generating incorrect outputs.

In some examples, transparent instrumentation may be used where middleware or library functions are instrumented to harvest data, obviating the need for making source code modifications. In some examples, manual instrumentation may identify read and write accesses to external data objects that need to be modified and may insert instrumentation code to the original program 102 and the translated program 106. In some examples, language runtime instrumentation may use the language runtime environment to intercept and collect data. In some examples, compiler-driven instrumentation may be used to identify source code locations for instrumentation.

The identification of comparison regions in block 204 may identify equivalent points between the original program 102 and the translated program 106. In some cases, a user may manually define these equivalent points via inspecting the source code of the original and translated programs. In some cases, external calls may be used to identify the equivalent points, as such external calls need to be identical between programs to ensure equivalent functioning. The comparison regions may further be influenced by size limits imposed by the context window length limitation of prompts for the LLM 104. Program analysis may further be used to identify a last update to a variable that is visible in both the source programming language and the target programming language-intermediate results may be ignored, as the different programming languages and their compilers may perform operations in different ways, but the last time the variable is updated may represent a final value that can be compared between the two programs.

While this process may continue indefinitely, it cannot generate a guarantee that the translated program 106 has perfectly replicated the functioning of the original program 102 for all inputs unless all possible inputs are executed. This may be infeasible, and so the parallel execution may be continued until some predetermined stopping-point has reached. In some cases, the stopping-point may be a predetermined length of time since the last error was discovered, with the length of time being based on the operator's judgment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code involved in performing the inventive methods, such as code translation with virtual runtime feedback 319. In addition to block 319, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 200, as identified above), peripheral device set 314 (including user interface (UI) device set 323, storage 324, and Internet of Things (IOT) sensor set 325), and network module 315. Remote server 304 includes remote database 330. Public cloud 305 includes gateway 340, cloud orchestration module 341, host physical machine set 342, virtual machine set 343, and container set 344.

Figure 3:
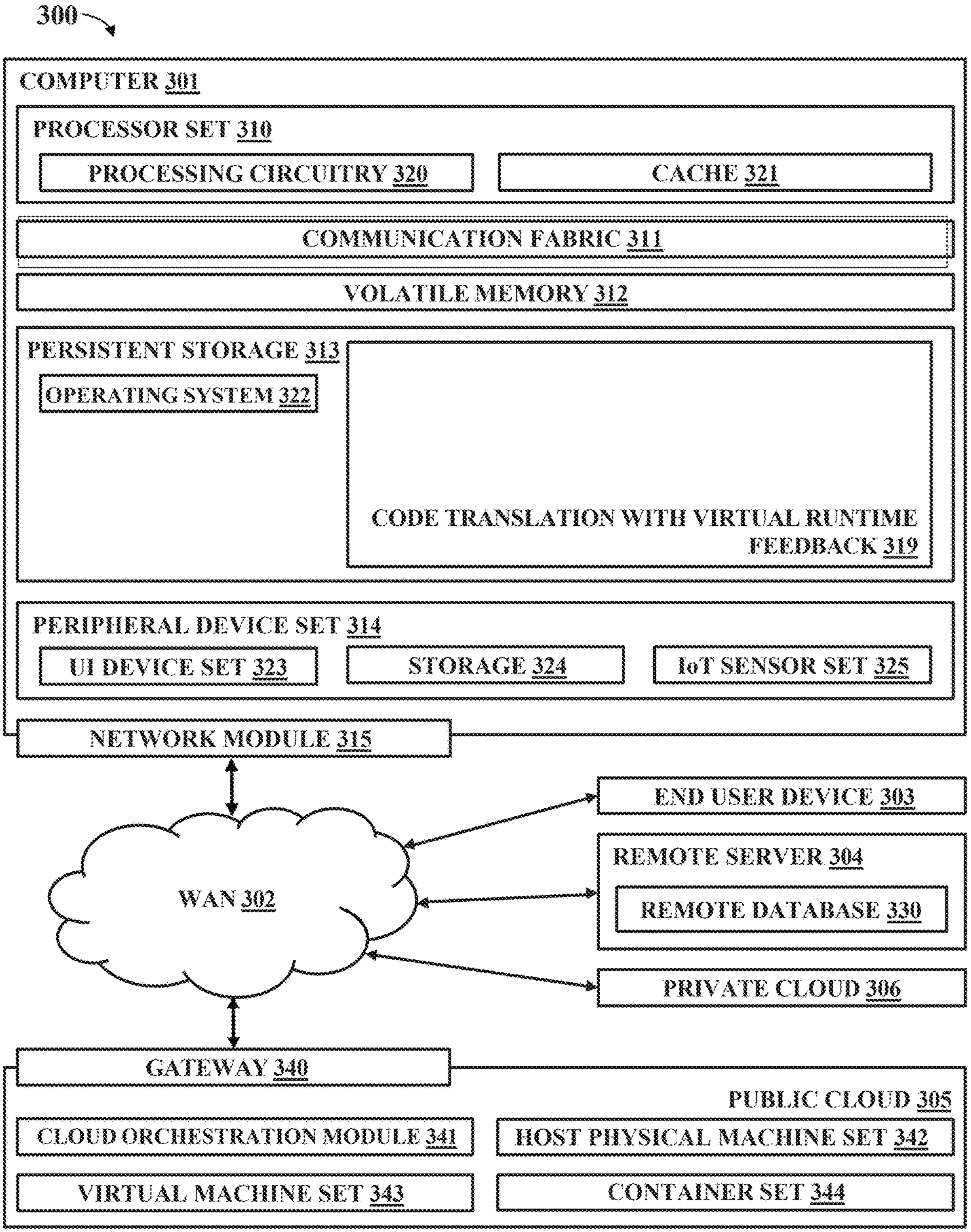
FIG. 3 is a block diagram of a computing environment that can perform code translation with virtual runtime feedback, in accordance with an embodiment of the present invention.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 200 in persistent storage 313.

COMMUNICATION FABRIC 311 is the signal conduction path that allows the various components of computer 301 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 314 includes the set of peripheral devices of computer 301.

Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315. WAN 302 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302. Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

Figure 4:
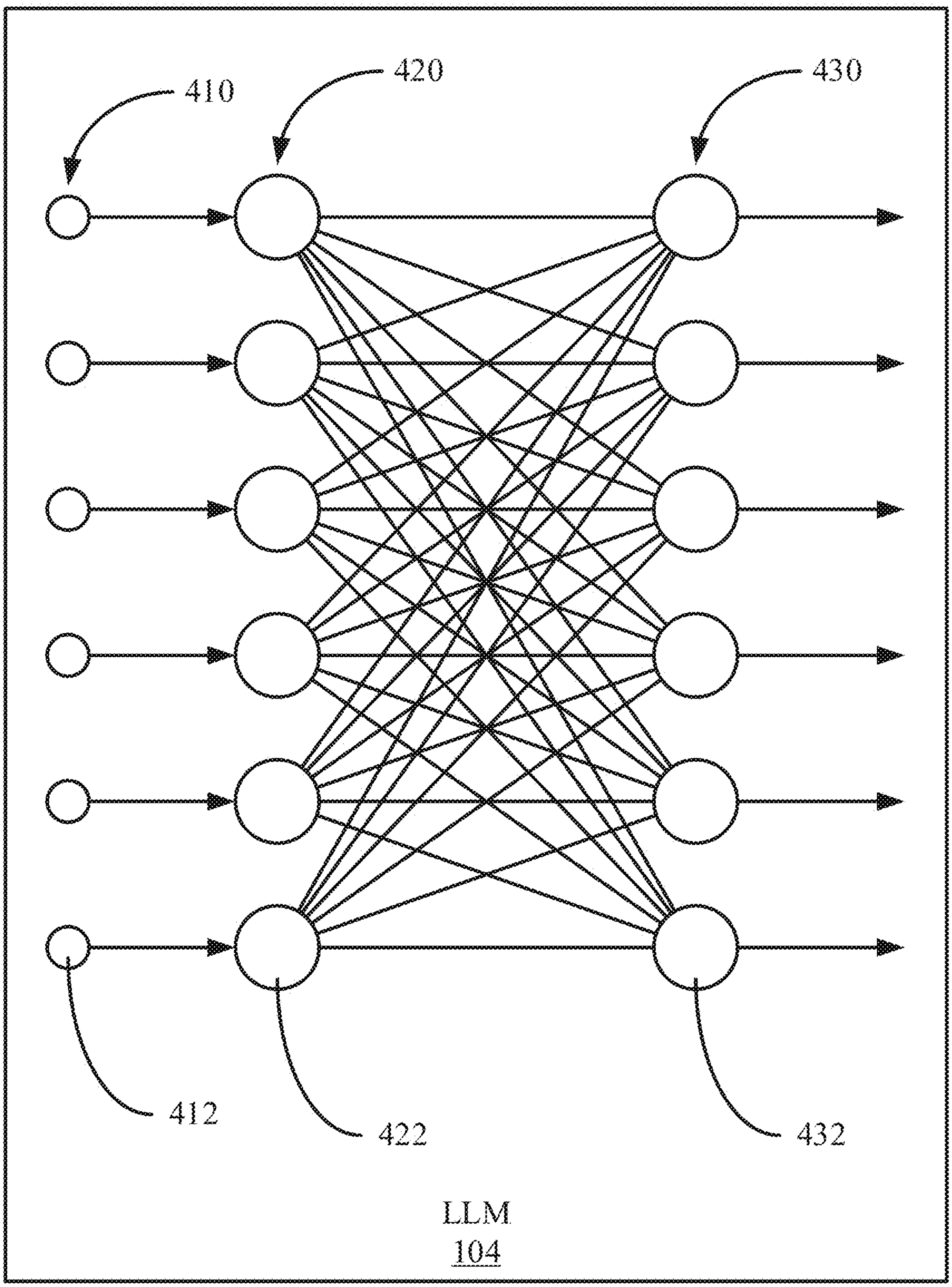
FIG. 4 is a diagram of an exemplary neural network architecture that can be used to implement part of the LLM, in accordance with an embodiment of the present invention.
Figure 5:
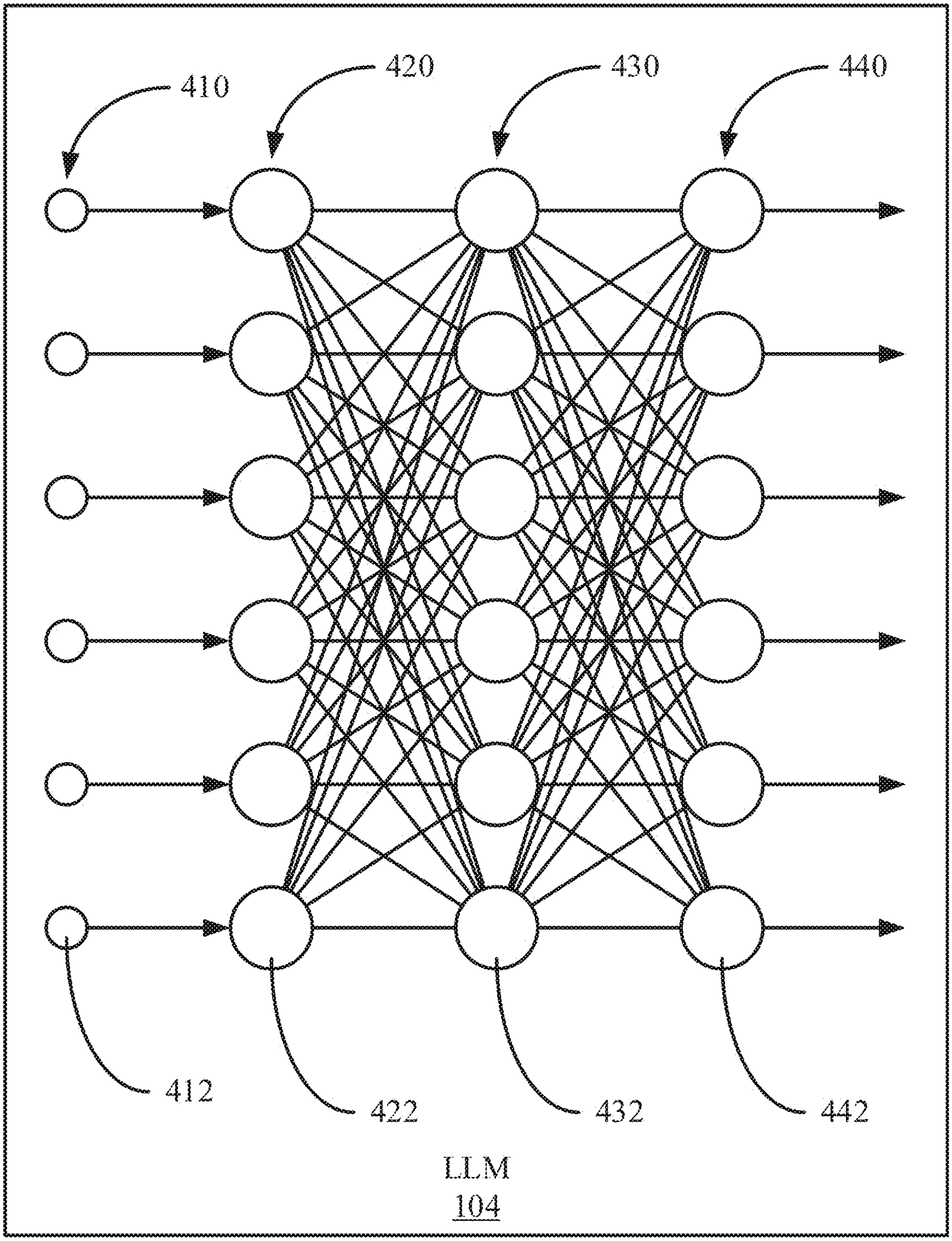
FIG. 5 is a diagram of an exemplary deep neural network architecture that can be used to implement p art of the LLM, in accordance with an embodiment of the present invention.

Referring now to FIGS. 4 and 5, exemplary neural network architectures are shown, which may be used to implement parts of the present models, such as LLM 104. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 420 of source nodes 422, and a single computation layer 430 having one or more computation nodes 432 that also act as output nodes, where there is a single computation node 432 for each possible category into which the input example could be classified. An input layer 420 can have a number of source nodes 422 equal to the number of data values 412 in the input data 410. The data values 412 in the input data 410 can be represented as a column vector. Each computation node 432 in the computation layer 430 generates a linear combination of weighted values from the input data 410 fed into input nodes 420, and applies a non-linear activation function that is differentiable to the sum. The exemplary simple neural network can perform classification on linearly separable examples (e.g., patterns).

A deep neural network, such as a multilayer perceptron, can have an input layer 420 of source nodes 422, one or more computation layer(s) 430 having one or more computation nodes 432, and an output layer 440, where there is a single output node 442 for each possible category into which the input example could be classified. An input layer 420 can have a number of source nodes 422 equal to the number of data values 412 in the input data 410. The computation nodes 432 in the computation layer(s) 430 can also be referred to as hidden layers, because they are between the source nodes 422 and output node(s) 442 and are not directly observed. Each node 432, 442 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of code translation with virtual runtime feedback (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for code translation, comprising:

translating source code for an original program, written in a first programming language, to source code for a translated program, written in a second programming language, using a language model;

instrumenting the original program and the translated program, using comparison regions of each, to configure the original program and the translated program to generate respective outputs at equivalent points;

executing the original program and the translated program concurrently to generate an original output and a translated output; and updating the language model to correct the translated program based on a discrepancy between the original output and the translated output.

2. The method of claim 1, further comprising identifying the equivalent points using external calls by the original program and the translated program.

3. The method of claim 1, further comprising identifying the equivalent points based on context window length limits imposed by the language model.

4. The method of claim 1, further comprising identifying the equivalent points based on a last update to a variable that is visible in both the original program and the translated program.

5. The method of claim 1, wherein updating the language model includes updating a prompt used to perform translation to correct the discrepancy during run-time.

6. The method of claim 1, wherein updating the language model includes fine-tuning the language model to correct the discrepancy offline.

7. The method of claim 1, wherein executing the original program and the translated program includes executing each with a shared memory buffer, with write accesses by the translated program that modify externally observable system states being blocked.

8. The method of claim 7, wherein executing the original program and the translated program includes executing the original program on an input and executing the translated program on information stored in the shared memory buffer by the original program.

9. The method of claim 1, further comprising comparing the original output to the translated output to generate a metadata output that captures the discrepancy, wherein updating the language model is based on the metadata.

10. The method of claim 1, further comprising continuing execution of the translated program after identification of a discrepancy between the original output and the translated output using a program state of the original program from a shared memory buffer.

11. A computer program product (CPP) for code translation, the computer program product comprising:

a set of one or more computer-readable storage media; and program instructions, collectively stored in the set of one or more storage media, for causing a processor set to perform the following computer operations:

translate source code for an original program, written in a first programming language, to source code for a translated program, written in a second programming language, using a language model;

instrument the original program and the translated program, using comparison regions of each, to configure the original program and the translated program to generate respective outputs at equivalent points;

execute the original program and the translated program concurrently to generate an original output and a translated output; and update the language model to correct the translated program based on a discrepancy between the original output and the translated output.

12. A computer system (CS) for code translation, the computer system comprising:

a processor set;

a set of one or more computer-readable storage media; and program instructions, collectively stored in the set of one or more storage media, for causing the processor set to perform the following computer operations:

translate source code for an original program, written in a first programming language, to source code for a translated program, written in a second programming language, using a language model;

instrument the original program and the translated program, using comparison regions of each, to configure the original program and the translated program to generate respective outputs at equivalent points;

execute the original program and the translated program concurrently to generate an original output and a translated output; and update the language model to correct the translated program based on a discrepancy between the original output and the translated output.

13. The system of claim 12, wherein the program instructions further cause the processor set to identify the equivalent points using external calls by the original program and the translated program.

14. The system of claim 12, wherein the program instructions further cause the processor set to identify the equivalent points based on context window length limits imposed by the language model.

15. The system of claim 12, wherein the program instructions further cause the processor set to identify the equivalent points based on a last update to a variable that is visible in both the original program and the translated program.

16. The system of claim 12, wherein the program instructions further cause the processor set to update a prompt used to perform translation to correct the discrepancy during run-time.

17. The system of claim 12, wherein the program instructions further cause the processor set to fine-tune the language model to correct the discrepancy offline.

18. The system of claim 12, wherein the program instructions further cause the processor set to execute the original program and the translated program with a shared memory buffer, with write accesses by the translated program that modify externally observable system states being blocked.

19. The system of claim 18, wherein the program instructions further cause the processor set to execute the original program on an input and to execute the translated program on information stored in the shared memory buffer by the original program.

20. The system of claim 12, wherein the program instructions further cause the processor set to continue execution of the translated program after identification of a discrepancy between the original output and the translated output using a program state of the original program from a shared memory buffer.

* * * * *